Dec. 11, 1962     W. H. STICKNEY ET AL     3,067,470

METHOD FOR PRODUCING A PULP MOLDING DIE

Original Filed Dec. 20, 1956     3 Sheets-Sheet 1

INVENTORS
Wendell H. Stickney
Richard F. Reifers

BY Karl W. Flocks

ATTORNEY

Dec. 11, 1962 W. H. STICKNEY ET AL 3,067,470
METHOD FOR PRODUCING A PULP MOLDING DIE
Original Filed Dec. 20, 1956
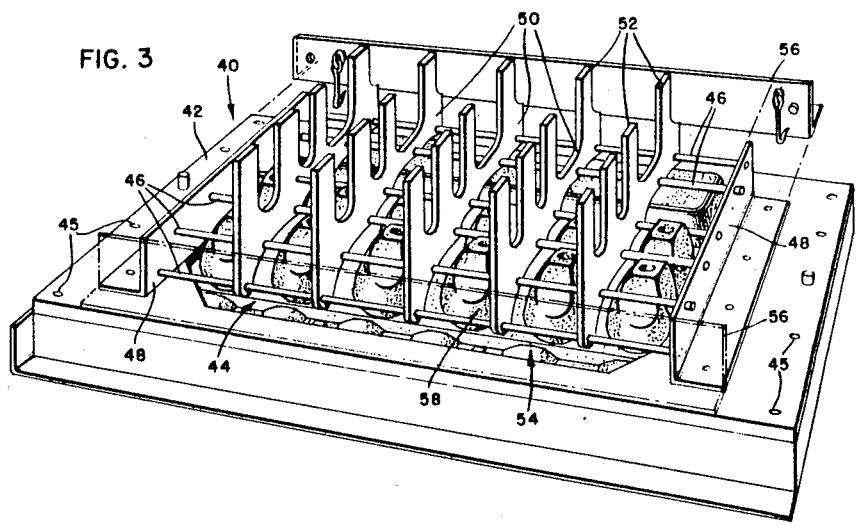
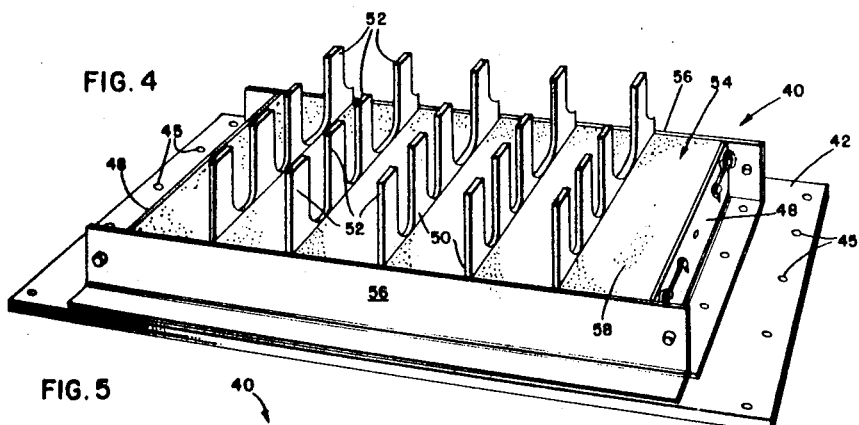
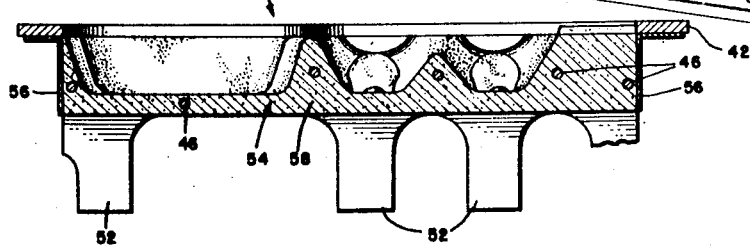

Dec. 11, 1962  W. H. STICKNEY ET AL  3,067,470
METHOD FOR PRODUCING A PULP MOLDING DIE
Original Filed Dec. 20, 1956  3 Sheets-Sheet 3

INVENTORS
Wendell H. Stickney
Richard F. Reifers
BY
Karl W. Flocks
ATTORNEY

United States Patent Office 3,067,470
Patented Dec. 11, 1962

3,067,470
METHOD FOR PRODUCING A PULP MOLDING DIE
Wendell H. Stickney, Wilbraham, Mass., and Richard F. Reifers, Lincolnwood, Ill., assignors to Diamond National Corporation, a corporation of Delaware
Original application Ser. No. 629,495, Dec. 20, 1956, now Patent No. 2,981,330, dated Apr. 25, 1961. Divided and this application May 6, 1960, Ser. No. 28,177
7 Claims. (Cl. 18—55)

The present invention relates to a method of making a pulp molding die and more particularly to a method of making a porous die suitable for use in producing pulp articles.

This application is a division of our copending application Serial No. 629,495 filed December 20, 1956, for "Pulp Molding," which issued as Patent No. 2,981,330.

Heretofore, pulp molding dies have been made with a woven wire cloth material stretched to conform to the die surface. The manufacture of this type of die has caused many difficulties due to the limited amount of distortion or stretching of which the wire cloth is capable to enable it to conform to the die surface. When the distortion of the woven wire is too great, it either tears or ruptures, or the mesh becomes so distorted as to cause it to fail to function properly as a pulp molding surface. This difficulty is particularly prevalent in the manufacture of dies for the making of pulp articles such as egg cartons and other complex designs.

It is therefore an object of the present invention to provide a novel method of making a pulp molding die that can be readily manufactured to conform to any desired design.

It is a further object of the present invention to provide a novel method of making a pulp molding die that is made up of a porous sintered material molded to the desired design.

Another object of the present invention is to provide a novel method of making a pulp molding die that is made up without wire woven cloth applied thereto.

These and other objects and the nature and advantages of the instant invention will be apparent from the following description taken in conjunction with the accompanying drawings, wherein:

FIG. 3 is a perspective view of the metal plate and attached reinforcing structure in inverted position over the male master pattern prior to application of the resin coated spherical particles;

FIG. 4 is a perspective view of the die shown in FIG. 1 in inverted position;

FIG. 5 is a sectional view taken along the line 5—5 of FIG. 1;

Molding dies of the type disclosed herein are used to form or mold pulp articles from liquid pulp mixtures, these mixtures being composed of fibers and some liquid, such as water, the liquid being drawn through the die, leaving a layer or coating of felted fibers on the molding surface. The article so formed is then removed from the molding surface and the process is repeated. The operation of the pulp molding dies is a well understood art, and it is believed unnecessary to discuss their functions in greater detail.

Figure 7:
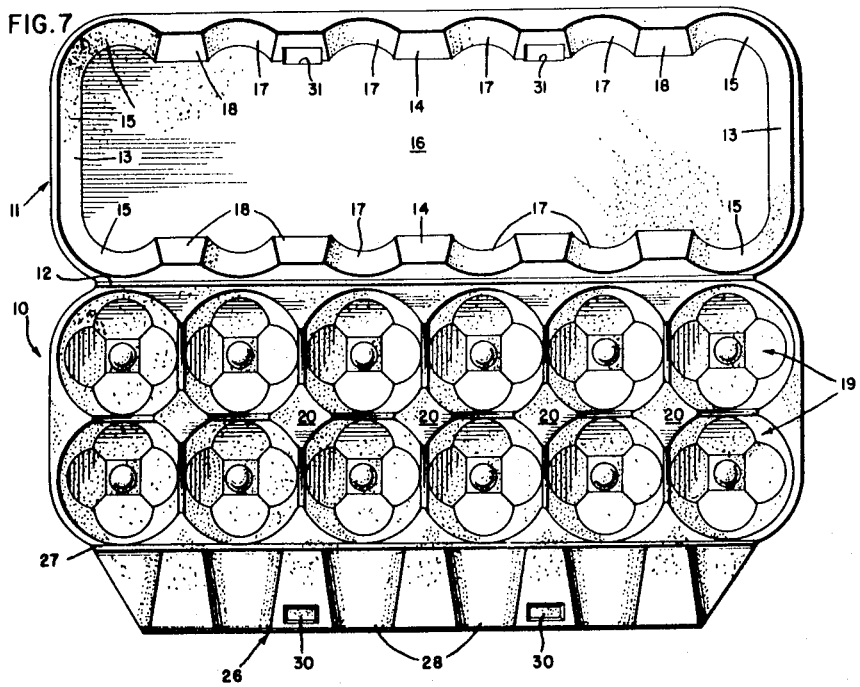
FIG. 7 is a top plan view of an article molded from the die of FIG. 1.

The following description of the molding die and the method of making it is described in conjunction with the molding of an egg carton having therein a plurality of pocket sections with a cover portion connected to this pocket section by a hinge structure which will enable it to be folded over, forming a closed container. This egg carton is illustrated in FIG. 7 and comprises a cellular compartmented bottom section, generally designated 10, to which a non-cellular or open faced, tray-like cover section 11 is integrally hinged by a longitudinal crease 12 at corresponding side margins of the section. Cover section 11 has pairs of opposed end walls 13 and side walls 14 integrally joined by rounded corners 15, and a flat top panel 16 is likewise integrally joined about its periphery with the walls. The exterior surface of this panel is smooth and continuous, suitable for the reception of printed matter or ornamentation.

The cover section side walls are of scalloped shape featuring longitudinally spaced, outwardly curved or recessed bays 17 to increase the egg room in the cover section, which recesses are spaced by intervening, inwardly extending abutment portions 18. These portions come into contact with the cellular bottom section 10 when the carton is closed.

The interior of bottom section 10 is partially subdivided into two rows of six egg receiving cells 19, by a longitudinally extending series of upstanding center separator posts 20 which are of generally rectangular outline at their tops.

An elongated internal cover bracing and locking flange 26 is integrally hinged by a longitudinally extending crease 27 to the side margin of bottom section 10 opposite its cover hinge 12. Flange 26, like the side walls of cover section 11, is of generally scalloped outline. It has egg accommodating bays or recesses 28 which are in transverse alignment with bottom section egg cells 19. The locking means comprises a pair of locking elements or lugs 30 which are integrally molded in the flange 26 to project outwardly adjacent the free outer edge thereof, and detent apertures 31 molded in the front wall 14 immediately adjacent its junction with cover top panel 16.

In use, when the eggs have been deposited in the bottom cells 19, flange 26 is swung to upstanding position adjacent the front row of eggs and the cover section 11 is swung downwardly into externally telescoped relation over the flange. As this occurs, the free front cover wall 14 slides downwardly over the locking lugs 30 until the flange and cover are in interlocked relationship.

The die, in accordance with the present invention, is used for molding the egg carton described heretofore.

Figure 1:
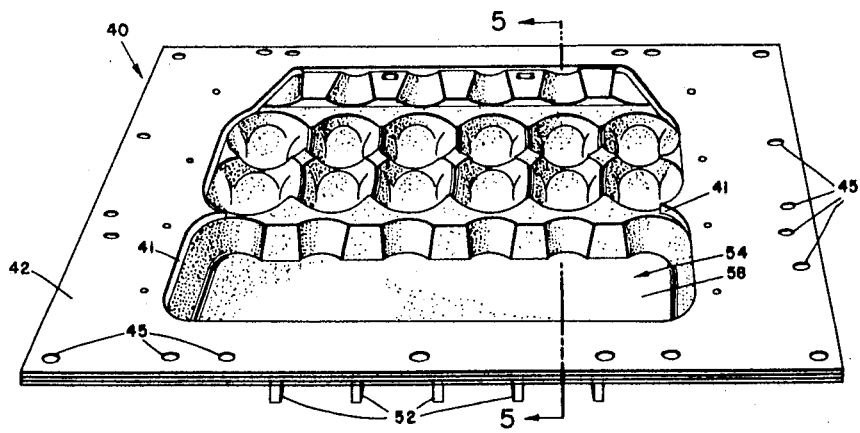
FIG. 1 is a perspective view of a pulp molding die made in accordance with the present invention.
Figure 2:
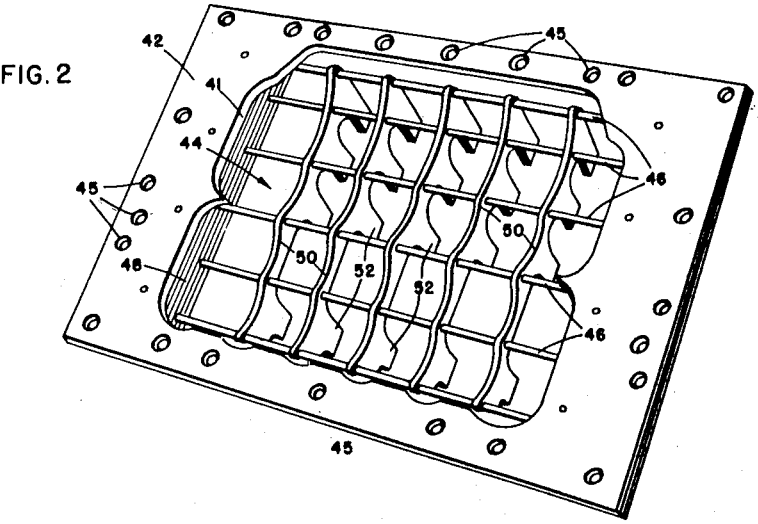
FIG. 2 is a perspective view of the die with the contoured molding surface removed.

The die shown in FIG. 1, designated in its entirety by the numeral 40, includes a flat metal plate 42 prepared with a window opening 44 on the center thereof corresponding in shape to the outer periphery of the egg carton. A plurality of holes 45 are provided in the plate 42 for attaching the finished die to a conventional die box. The plate 42 becomes effective in use as a margin strap and also as a support for the contoured molding surface. Attached to the underside of the plate 42 is a reinforcing structure or grid arrangement which may consist of a plurality of rods 46 supported at each end in a plate 48, each of which is attached to the plate 42 by screws. A plurality of pedestal supports 50 are arranged on the rods at equal intervals, each of which has a plurality of feet 52. Four feet 52 are illustrated on each support 50. The supports act to absorb any tendency for the molding die to collapse under vacuum. The feet 52 rest on the platen of the main wet end cylinder of the molding apparatus.

Figure 6:
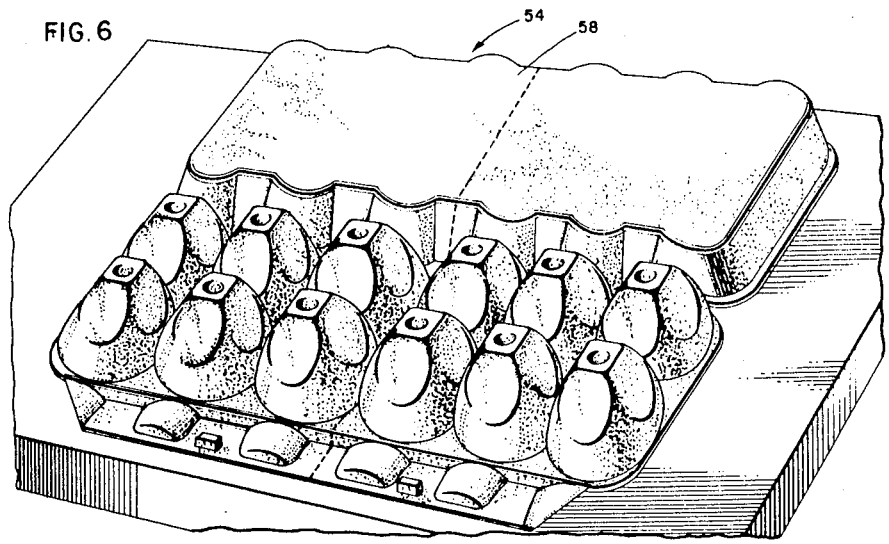
FIG. 6 is a perspective view of the male master pattern.

To form the contoured molding surface of the die, a male master mold or pattern 54 is utilized. This master mold or pattern 54 is illustrated in FIGS. 3 and 6. This mold or pattern may be made of plaster or metal and conforms to the shape of the article to be molded when in the flat position.

To make the desired pulp molding die 40, the metal plate 42 with its attached grid arrangement is inverted and placed over said male master mold or pattern 54 so that the window opening 44 in the plate is positioned to fit over the periphery of the pattern 54 with the contours in the pattern extending upwardly through the window opening 44 between the rods 46 and the pedestal supports 50 of the grid arrangement, as shown in FIG. 3. Side plates 56 are attached at each side to the plates 48, whereby the entire pattern is enclosed.

For ease in removal after the molding of the die, the male master or pattern 54 may be coated with a silicone resin and baked. The silicone acts as a release agent during the molding.

The molding material 58, which has been previously prepared, is poured over the pattern 54 until the pattern is completely covered and the molding material reaches the height of the plates 48 and 56, as shown in FIG. 4. The entire mold is vibrated during the pouring of the molding material.

The molding material 58 is made up of a plurality of small spherical particles having a diameter of approximately 3 to 50 mils, preferably in the range of 8–30 mils. These particles may be small glass beads which are spheres of an approximate diameter of 15 mils, metal powders which are spherical particles of a diameter of 15 to 25 mils, spherical sand particles of similar diameter or other spherical particles. The spherical particles are coated with a phenolic resin and dried to yield a freely pourable coated powder.

After the coated spherical particles have been poured into the mold and vibrated sufficiently to fill all crevices, the mold is placed in an oven and heated to a temperature of about 350° F. for several hours. After cooling to room temperature, the resulting die is removed from the pattern 54. This die, which is illustrated in FIG. 1, has a porous resin-sintered spherical particle structure wherein the spherical particles are bonded together at portions of their peripheries by the cured resin leaving voids and pores for the passage of liquid during the pulp molding operation.

A specific example of the treatment of the spherical particles and the molding and curing of a die is as follows: One hundred parts by weight of spherical glass beads having a diameter of .015 inch are placed in a mixer and a mulling mix action is started. Slowly three-fourths part by weight of a liquid phenol-formaldehyde bonding resin is added to the mixer. When the mixture is complete four parts by weight of a dry powdered phenol-formaldehyde resin are added slowly until the mixture has become complete and uniform. The resulting coated beads should be dry enough to pour freely. The coated particles are now poured into the mold as illustrated in FIGS. 3 and 4, while vibrating the entire mold. The pattern has previously been treated with a silicone and baked to provide a release agent. The mold is placed in an oven and the resin is cured by heating at 150° for two hours. The temperature is increased in increments of 20° F. for ten hours until a temperature of 350° F. is reached. The temperature is held at 350° F. for two hours. The mold is removed from the oven and allowed to cool to room temperature. The die is now removed from the pattern and is ready for use in pulp molding.

A second example of this method is as follows: 2000 cc. of bronze powder, approximately spherical in shape and about .018 inch in diameter was placed into a muller mixer. The composition of the metal powder is not critical, however, the bronze powder used here contained 95.5% copper coated with 4.5% tin. 30 cc. of alcohol was added to the mixer and the mixing continued for two minutes. With the mixer running 68 gms. of a liquid phenol-formaldehyde bonding resin was very slowly added until the mixture was complete, about eight minutes. Each particle should be coated with the liquid, and the resulting powder should spill freely without balling up. With the mixer still running, 204 gms. of a dry powdered phenol-formaldehyde resin was added gradually, and mixing continued for about eight minutes. The treated powder was now ready for pouring freely into the mold, and the mold could be vibrated or rapped with a hammer to pack the particles into all crevices. It was now ready for curing to produce the finished mold. The mold was heated to 340° F. for three hours. After removal of the die from the mold, the die was returned to the oven for another three hours.

If desired, the die 40 may consist of a "window plate" 42 which is attached directly to a rectangular die box (not illustrated). Various forms of reinforcing can be utilized in the die box, such as reinforcing rods buried in the resin-sintered mass, and a rectangular piece of expanded metal grid added to the surface of the mass to add structural strength. Likewise, when desired, the spherical particles may extend flush with the surface of the "window plate" 42 and margin straps may be assembled onto the plate to form the outline of the egg carton to the thickness desired. This marginal thickness in the "window plate" 42 is illustrated at 41 in FIG. 1.

The finished die assembly 40 is now ready for molding cartons. A typical pulp furnish that may be used is

| | Percent |
|---|---|
| 85% blank news | |
| 15% bleached kraft | } 75 |
| 90% newspaper | |
| 10% bleached kraft deinked | } 25 |

The consistency is 60%, molding time 7 seconds, utilizing a vacuum before molding of 5″ Hg and 18″ Hg after molding. A transfer air pressure of 50 p.s.i. is used and the cartons are dried on a plaster drying form in an oven at 350° F. for twenty-five minutes.

The curing time recited heretofore for sintering the resin and spherical particles is a function of the weight and cross-section of the article being formed, and should be varied accordingly.

The proportions of resin to spherical particles should be maintained such that the resulting material is as rich in resin as possible and yet capable of freely flowing like dry sand. Various types of spherical particles may be utilized as well as various types of bonding agents.

This method of preparing dies has many advantages over the presently used method utilizing wire woven cloth. Experimental and pilot plant work can be accomplished with much less time and expense where it is necessary to study design changes and modify the molding die accordingly. Screenless dies, in accordance with the present invention, are easily reconstructed in different dimensions with altered design features incorporated. Temporary molding dies may be quickly and cheaply prepared where only a few product samples are required. The screenless molding dies in accordance with the present invention may be made at less than half the expense of conventional screened molds. Maintenance of screenless molding dies described in this application is simplified. When a unit becomes damaged it may be scrapped and incur less expense than an overhaul of a conventional screened molding die. The appearance of the product made on a screenless molding die in accordance with this invention would be noticeably improved. The surface of the product is uniform and bears no marks of the screens or the seams.

It will be obvious to those skilled in the art that various change may be made without departing from the spirit of the invention and therefore the invention is not limited to what is shown in the drawings and described in the specification but only as indicated in the appended claims.

What is claimed is:

1. A method of making a porous pulp molding die having an exterior open faced, contoured molding surface provided with a peripheral portion which comprises preparing a window opening extending through a flat metal plate, said opening conforming to the shape of the peripheral portion of the desired molding surface, attaching a reinforcing grid arrangement below the window opening of said metal plate, preparing a male master pattern mold conforming to the contours of the desired molding surface, placing said metal plate in inverted position, with the grid arrangement extending upwardly over said male master pattern so that the contours thereon are located over said window opening, pouring phenolic resin coated spherical bodies onto said male master pattern to a thickness covering the contours of said pattern as well as said reinforcing grid arrangement, said spherical bodies having a diameter of approximately 3 to 50 mils and being made of a material which is hard, non-porous and stable at the curing temperatures of said phenolic resin, sintering said phenolic resin coated bodies together into a composite porous structure by heating until said resin is cured followed by cooling to bond said spherical bodies together at portions of their peripheries by the cured resin leaving voids and pores for the passage of liquid, and separating said male master pattern from said resulting die.

2. In the method of claim 1 wherein said spherical bodies are glass beads.

3. In the method of claim 1 wherein said spherical bodies are metal.

4. A method of making a porous pulp molding die having an exterior open-faced contoured molding surface, which comprises preparing a male master pattern mold conforming to the contours of the desired molding surface, enclosing the pattern mold within side plates, pouring phenolic resin coated spherical bodies onto said male master pattern to a thickness covering the contours of said pattern, sintering said phenolic resin coated bodies together into a composite porous structure by heating until said resin is cured, followed by cooling to bond said spherical bodies together at portions of their peripheries by the cured resin leaving voids and pores for the passage of liquid, and separating said male master pattern from said resulting die.

5. In the method of claim 4 wherein said spherical bodies have a diameter of approximately 3 to 50 mils.

6. In the method of claim 4 wherein said spherical bodies are glass beads.

7. In the method of claim 4 wherein said spherical bodies are metal.

References Cited in the file of this patent

UNITED STATES PATENTS

| | | |
|---|---|---|
| 2,064,435 | Loeffler | Dec. 15, 1936 |
| 2,359,201 | Chaplin et al. | Sept. 26, 1944 |
| 2,460,242 | Renaud | Jan. 25, 1949 |
| 2,632,922 | Kish | Mar. 31, 1953 |
| 2,806,509 | Bozzacco et al. | Sept. 17, 1957 |
| 3,001,582 | Kindseth et al. | Sept. 26, 1961 |